United States Patent
Sadok et al.

(10) Patent No.: US 9,990,699 B1
(45) Date of Patent: Jun. 5, 2018

(54) BLOCK MATCH DENOISING FOR REAL-TIME IMAGING

(71) Applicant: Rockwell Collins, Inc., Cedar Rapids, IA (US)

(72) Inventors: Mokhtar M. Sadok, Cedar Rapids, IA (US); David W. Jensen, Marion, IA (US); Andrew J. LeVake, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days. days.

(21) Appl. No.: 15/075,788

(22) Filed: Mar. 21, 2016

(51) Int. Cl.
| G06K 9/40 | (2006.01) |
| G06T 5/00 | (2006.01) |
| G06K 9/62 | (2006.01) |
| G06T 5/20 | (2006.01) |
| G06T 1/20 | (2006.01) |

(52) U.S. Cl.
CPC ............ G06T 5/002 (2013.01); G06K 9/6212 (2013.01); G06T 1/20 (2013.01); G06T 5/20 (2013.01); *G06T 2207/20021* (2013.01)

(58) Field of Classification Search
None
See application file for complete search history.

(56) References Cited

U.S. PATENT DOCUMENTS

| 7,477,802 B2 * | 1/2009 | Milanfar | G06T 3/4053 358/1.2 |
| 7,889,950 B2 * | 2/2011 | Milanfar | G06K 9/40 348/441 |
| 8,897,588 B2 * | 11/2014 | Wang | G06T 5/003 382/255 |
| 2006/0239336 A1 * | 10/2006 | Baraniuk | H04L 25/20 375/216 |
| 2010/0177241 A1 * | 7/2010 | Chen | H04N 5/144 348/451 |
| 2015/0110386 A1 * | 4/2015 | Lin | G06T 5/002 382/159 |
| 2015/0178591 A1 * | 6/2015 | Fergus | G06T 5/005 382/157 |
| 2015/0187053 A1 * | 7/2015 | Chen | G06T 5/002 382/264 |
| 2015/0262341 A1 * | 9/2015 | Nash | H04N 5/23229 348/208.6 |
| 2015/0281506 A1 * | 10/2015 | Aarnio | G06T 1/60 348/231.2 |

(Continued)

OTHER PUBLICATIONS

Xu, Jun, et al. "Patch group based nonlocal self-similarity prior learning for image denoising." Proceedings of the IEEE International Conference on Computer Vision. 2015.*

(Continued)

*Primary Examiner* — Andrae S Allison
(74) *Attorney, Agent, or Firm* — Angel N. Gerdzhikov; Donna P. Suchy; Daniel M. Barbieri

(57) ABSTRACT

A low-latency method for applying image processing steps includes processing and displaying portions of the image as they are received in real-time. In a denoising process, the portion is denoised by selecting pixels, establishing a block centered on each pixel, identifying similar blocks within the portion, and performing a filtering process such as hard thresholding before the entire image is received. Pixels within each block may also be averaged.

20 Claims, 7 Drawing Sheets

(56) References Cited

U.S. PATENT DOCUMENTS

2015/0332438 A1* 11/2015 Lin .................. G06T 5/002
382/159

OTHER PUBLICATIONS

Dabov, Kostadin, et al. "Image denoising by sparse 3-D transform-domain collaborative filtering." IEEE Transactions on image processing 16.8 (2007): 2080-2095.*

Cozzolino, Davide, et al. "Fast adaptive nonlocal SAR despeckling." IEEE Geoscience and Remote Sensing Letters 11.2 (2014): 524-528.*

Mairal, Julien, et al. "Non-local sparse models for image restoration." Computer Vision, 2009 IEEE 12th International Conference on. IEEE, 2009.*

Xu, Yuquan, et al. "Real-time stereo vision system at nighttime with noise reduction using simplified non-local matching cost." Intelligent Vehicles Symposium (IV), 2016 IEEE. IEEE, 2016.*

Alkinani, Monagi H., and Mahmoud R. El-Sakka. "Non-local means for stereo image denoising using structural similarity." International Conference Image Analysis and Recognition. Springer International Publishing, 2015.*

Boracchi, Giacomo, and Alessandro Foi. "Multiframe raw-data denoising based on block-matching and 3-D filtering for low-light imaging and stabilization." The 2008 International Workshop on Local and Non-Local Approximation in Image Processing, Lausanne, Switzerland. 2008.*

Tao Chen, "Adaptive temporal interpolation using bidirectional motion estimation and compensation," Proceedings. International Conference on Image Processing, 2002, pp. II-313-II-316 vol. 2.*

Asif Khan and Mahmoud R. El-Sakka, "Non-Local Means using Adaptive Weight Thresholding", International Conference on Computer Vision Theory and Applications, VISAPP'2016, pp. 67-76, Feb. 2016, Rome, Italy.*

Seong-Won Lee, Vivek Maik, Jihoon Jang, Jeongho Shin and Joonki Paik, "Noise-adaptive spatio-temporal filter for real-time noise removal in low light level images," in IEEE Transactions on Consumer Electronics, vol. 51, No. 2, pp. 648-653, May 2005.*

* cited by examiner

BLOCK MATCH DENOISING FOR REAL-TIME IMAGING

BACKGROUND

Low-light camera systems require time to gather light and then perform signal processing. Some applications, such as military applications, have low-latency requirements; there is not enough time for the light sensor in commercial cameras to collect a meaningful number of photons resulting in substantial noise in the captured videos. Systems with specialized low-light sensors require less exposure time but are more expensive than commercial cameras. A software based solution for denoising a commercial camera image stream in a low-light environment would be cheaper, but existing denoising processes, such as those using frame buffering, makes include latency that is unsuitable for applications requiring a fast response time.

SUMMARY

In one aspect, embodiments of the inventive concepts disclosed herein are directed to a low-latency system and method for denoising a low-light image by processing and displaying portions of the image as they are received in real-time. The portion is denoised by selecting pixels, establishing a block centered on each pixel, identifying similar blocks within the portion, and performing a filtering process before the entire image is received.

In a further aspect, the portion is denoised by pixel averaging within each block.

In a further aspect, a portion of an image in an image stream is processed for image compression, image enhancement, image restoration, or pattern recognition in addition to, or instead of denoising.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
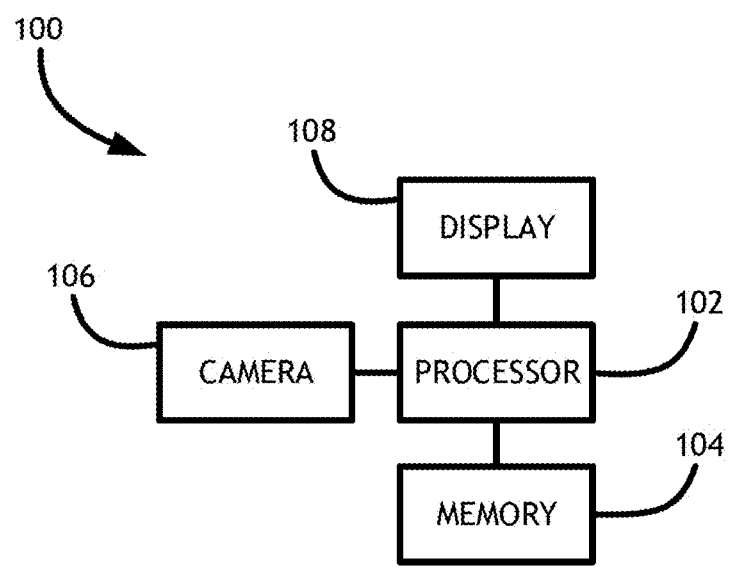
FIG. 1 shows an exemplary embodiment of a computer system for denoising a low-light image stream according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for denoising a low-light image piecemeal to reduce latency.

Figure 2A:
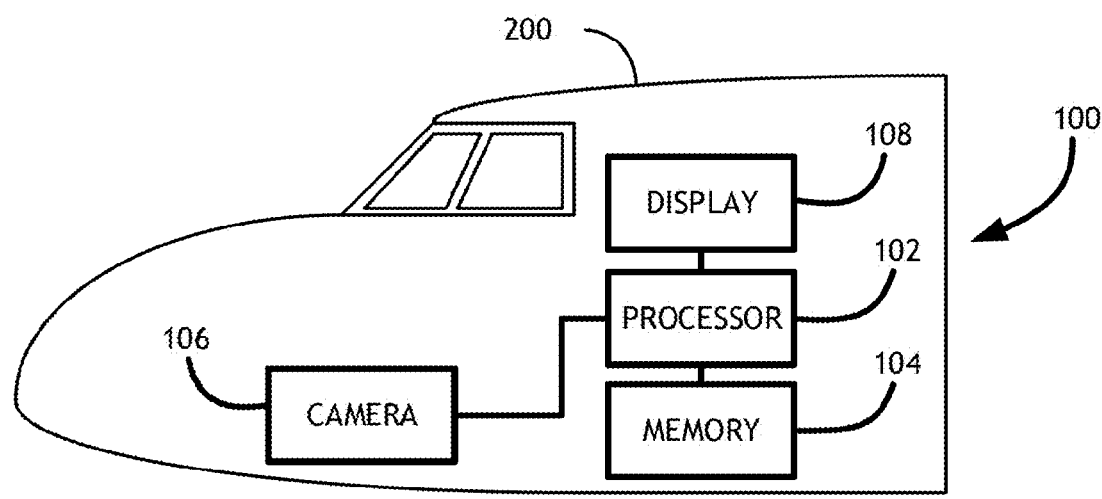
FIG. 2A shows a block diagram of a computer system on board an aircraft for denoising a low-light image stream according to the inventive concepts disclosed herein.
Figure 2B:
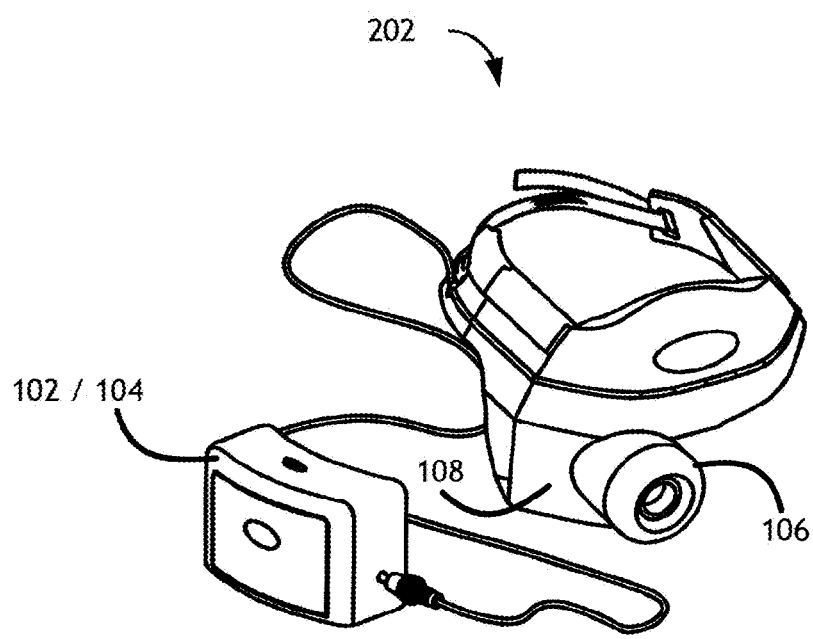
FIG. 2B shows a personal night vision system suitable for implementing embodiments of the inventive concepts disclosed herein.

Referring to FIGS. 1, 2A, and 2B, an exemplary embodiment of a computer system 100 for denoising a low-light image in an image stream according to the inventive concepts disclosed herein, an exemplary embodiment of the computer system 100 on board an aircraft 200, and an exemplary embodiment of a personal night vision goggle system 202 are shown. The computer system 100 includes a processor 102, memory 104 coupled with the processor 102 for storing processor executable code, a camera 106 coupled with the processor 102, and a display 108. Some embodiments of the camera 106 include digital image sources such as conventional cameras, video cameras, bare sensors, single pixel cameras, internet based video streams, or laser based radar (LIDAR). The camera 106 sends a stream of scan lines to the processor 102. The processor 102 denoises a small number of lines continuously as they are received from the camera 106 without waiting for the whole frame. In one exemplary embodiment, the processor 102 receives a maximum of 80 lines out of 1200 lines in a 1200 by 1600 frame. The processor 102 denoises and displays the 80 lines in a sliding window fashion on the display 108. Any denoising process may be utilized, provided such process can be performed on only a portion of an image in an image stream, and such process can be performed substantially in real-time as portions of the image are received from the camera 106.

In some embodiments, denoising comprises a block matching process. Block matching processes may include spatial Block Matching and sparse wavelet collaborative filtering (BM3D), non-local means (NLM), or other such methods of intra-image segment comparison. In some embodiments, denoising also includes some form of signal filtering after the block matching process is applied. Filtering may comprise a smoothing step such as with a Weiner filter.

While specific embodiments describe denoising operations, other image processing operations are envisioned. For example, pattern recognition, image compression, image restoration, and image enhancement may all be performed on a portion of an image in an image stream. Successive portions of the image and subsequent images in the image stream are likewise processed provided such processing can be performed substantially in real-time.

In some embodiments, the computer system 100 is installed in a mobile platform such as an aircraft 200 where streaming, denoised low-light video data is displayed to the pilot or operator with low latency. Furthermore, some embodiments comprise portable cameras and personal night vision devices 202. A person skilled in the art may appreciate that mobile platforms may comprise any non-stationary application.

The processor 102 may comprise a general purpose processor configured via software or firmware to perform the functions described herein or a dedicated hardware device. Furthermore, while the processor 102 is depicted as a distinct element from the camera 106, the functions performed by the processor 102 may be incorporated into a dedicated processor in the camera 106 configured for capturing an image from a light sensor and processing portions of the image.

Figure 3:
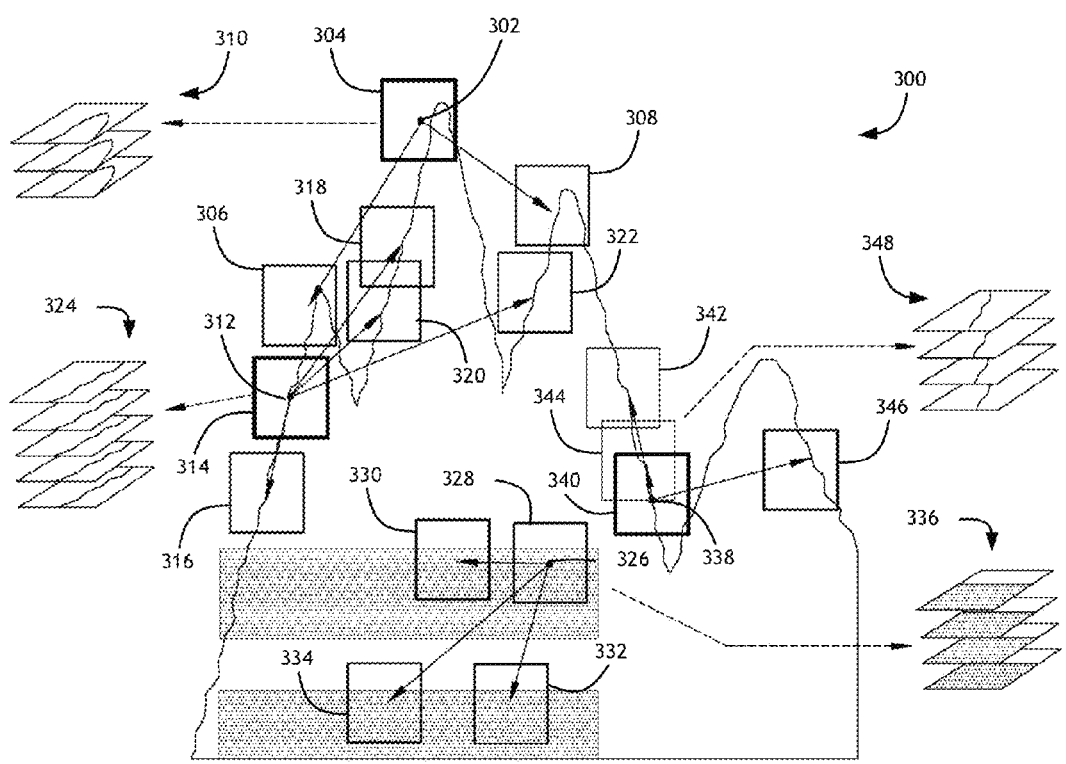
FIG. 3 shows a block diagram of a portion of an image in an image stream illustrating a block matching process according to the inventive concepts disclosed herein.
Figure 4:
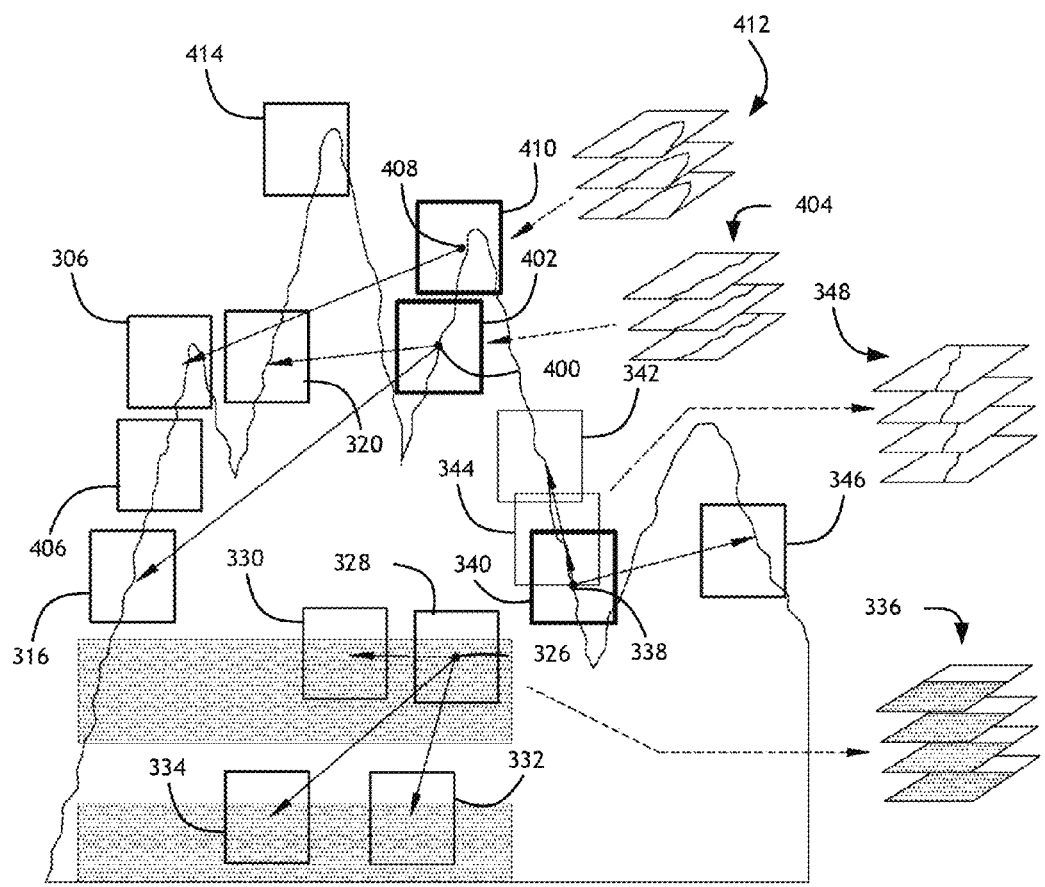
FIG. 4 shows a block diagram of a portion of an image in an image stream illustrating a block matching process according to the inventive concepts disclosed herein.

Referring to FIGS. 3 and 4 block diagrams of a portion 300 of an image in an image stream illustrating a block matching process according to the inventive concepts disclosed herein are shown. Referring specifically to FIG. 3, a computer processor receives the portion 300 of the image from a camera as image lines become available. The portion 300 comprises some minimum number of image lines. The minimum number of image lines may be statically defined based on a statistical analysis of denoised images to determine an optimal number of lines for an allocated length of processing time; for example, for a given processing time of three milliseconds, 20 image lines may produce the best quality image within that time frame.

Furthermore, within a given allocated length of processing time, a minimum of 20 image lines may be necessary while 80 image lines is an upper limit set according to hardware limitations or a user configuration. Therefore, the minimum number of image lines may be dynamically determined based on the data rate of the image stream, past performance of the denoising processes for the image stream (for example, the ability of the processor to find matching blocks with a particular number of image lines), or other performance factors that are dependent on the number of image lines provided the portion 300 comprises only a subset of the whole image.

In some embodiments, the processor selects one or more pixels 302, 312, 338 to analyze and then selects a reference block 304, 314, 340 of pixels, each centered on one of the one or more pixels 302, 312, 338. The processor than identifies comparison blocks 306, 308, 316, 318, 320, 322, 330, 332, 334, 342, 344, 346. Each comparison block 306, 308, 316, 318, 320, 322, 330, 332, 334, 342, 344, 346 is a member of a 3-D array or group 310, 324, 336, 348, each group 310, 324, 336, 348 comprising a reference block 304, 314, 340 and similar comparison blocks 306, 308, 316, 318, 320, 322, 330, 332, 334, 342, 344, 346.

The size of each reference block 304, 314, 340 is a predefined to optimize the speed and performance of the denoising process. For example, a large reference block size may operate faster but provide reduced granularity because each reference block 304, 314, 340 would match fewer comparison blocks 306, 308, 316, 318, 320, 322, 330, 332, 334, 342, 344, 346. Likewise, a smaller reference block size would produce larger groups 310, 324, 336, 348 but require more time to process.

Once groups 310, 324, 336, 348 are defined, the processor determines a denoised value for the one or more pixels 302, 312, 338. The denoised value may be determined by performing a 3-D transform on the group 310, 324, 336, 348 and attenuate noise by hard thresholding. The processor then aggregates overlapping reference blocks 304, 314, 340 within the portion 300 of the image to produce a weighted, denoised average.

In some embodiments, the processor applies an additional filter the portion 300 of the image. For example, the processor may apply a Weiner filter based on a denoised reference block 304, 314, 340.

Such process is applied to all or some subset of the pixels 302, 312, 338 in the portion 300. As the processor receives more image lines from the camera, the processor may establish a completely new portion 300 comprising newly received image lines, or the processor may remove image lines of a fully processed portion 300 and replace them with newly received image lines such that the size of the portion 300 remains substantially constant. Where lines of the fully processed portion 300 are replaced by newly received image lines, comparison blocks 306, 308, 316, 318, 320, 322, 330, 332, 334, 342, 344, 346 originating from a fully processed segment of the portion 300 may be weighted more heavily than comparison blocks 306, 308, 316, 318, 320, 322, 330, 332, 334, 342, 344, 346 originating from newly received image lines.

Referring specifically to FIG. 4, during the denoising process, subsequent pixels 400, 408 in the portion 300 of the image (selected for denoising after the initial pixels 302, 312, 338 have been processed) are denoised according to a similar procedure. In some embodiments, subsequent pixels 400, 408 may be centered on reference blocks 402, 410 that served as comparison blocks 308, 322 in a previous iteration. During processing of the subsequent pixels 400, 408, the processor may identify comparison blocks 316, 320 for a first new group 404 and comparison blocks 306, 308 for a second new group 412 that do not exactly correspond to the groups 310, 324 to which the reference blocks 402, 410 previously belonged as comparison blocks 308, 3 22. For example, where the processor identifies a set of comparison blocks 316, 318, 320, 322 based on some threshold similarity to a particular reference block 314 to form a corresponding group 324, the processor may exclude some of those blocks from the first group 404 when analyzing the subsequent reference block 402 based on a similarity threshold.

The processor displays denoised portions 300 of the image as processing is completed, without waiting for the entire image to be denoised. In some embodiments, the processor may analyze pixels 302, 312, 326, 328, 400, 408 in sequence such that image lines are denoised and sent to a display while subsequent image lines are still being processed.

In some embodiments, the processor utilizes an NLM process to denoise pixels 302, 312, 326, 328, 400, 408. Using the NLM process, denoised values for each pixel 302, 312, 326, 328, 400, 408 are determined based on an average (mean) of pixels in the portion 300 weighted according a similarity of each pixel 302, 312, 326, 328, 400, 408 to other, non-local pixels in the portion 300 (inter-block similarity). Segments of the portions 300 may also exhibit local pixel similarity within each reference block 304, 314, 340, 402, 410 and comparison block 306, 308, 316, 318, 320, 322, 330, 332, 334, 342, 344, 346 (intra-block similarity). In some embodiments, intra-block similarity in each reference block 304, 314, 340, 402, 410 is used to further denoise each pixel 302, 312, 326, 328, 400, 408 or to denoise each pixel 302, 312, 326, 328, 400, 408 before determining inter-block similarity to produce the weighted non-local mean value.

In a system having multiple processors or multiple processor cores, multiple pixels 302, 312, 326, 328, 400, 408 may be denoised in parallel.

Figure 5:
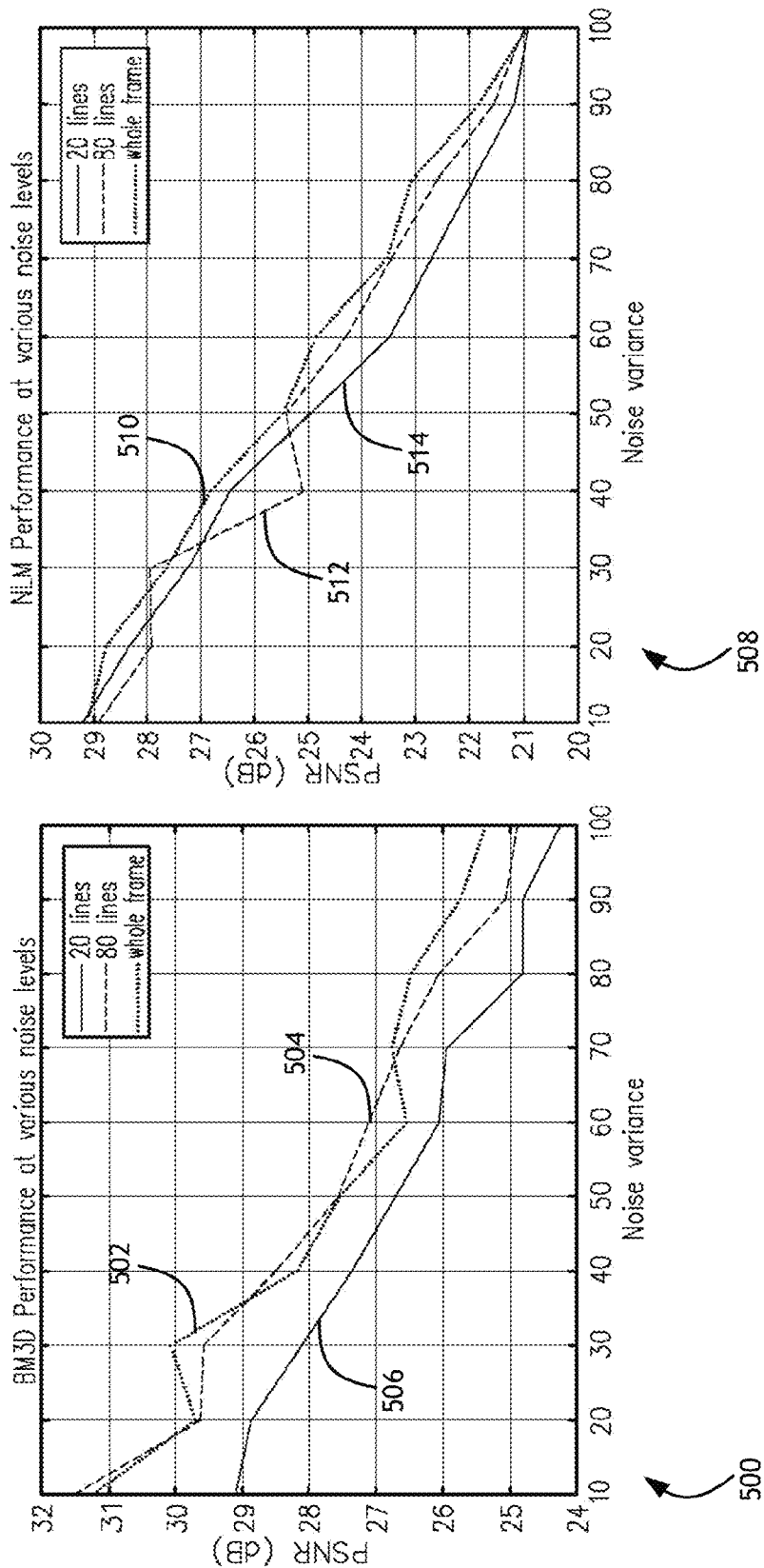
FIG. 5 shows graphs of the results of denoising processes operating on portions of an image in an image stream according to exemplary embodiments as compared the entire image.

Referring to FIG. 5, graphs 500, 508 of the results of denoising processes operating on portions of an image in an image stream according to exemplary embodiments as compared the entire image are shown. Referring to a graph 500 of a BM3D denoising process, the graph 500 shows the relation of injected noise or noise variance to the peak signal-to-noise ratio (PSNR) when denoising various portions of the complete image 502. Noise variance as compared to PSNR is a measure of the performance of the denoising process. For a complete image 502 with 1200 lines in a 1200 by 1600 frame, the PSNR resulting from denoising the complete image 502 is substantially similar to the PSNR resulting from denoising an 80 line portion 504 of the image. Furthermore, the PSNR resulting from denoising a 20 line portion 506 of the image, while generally lower than the PSNR resulting from denoising either the complete image 502 or the 80 line portion 504, the difference is disproportionate to the difference in available data.

Referring to a graph 508 of a NLM denoising process, the graph 508 also shows the relation of noise variance to the peak signal-to-noise ratio (PSNR) when denoising various portions of the complete image 510. The PSNR resulting from denoising the complete image 510 is substantially similar to the PSNR resulting from denoising both an 80 line portion 512 of the image and a 20 line portion 514 of the image, though again the 20 line portion results in a generally but not universally lower PSNR. As compared to a BM3D process, the PSNR resulting from denoising 20 line portions 506, 514 is similar.

Figure 6:
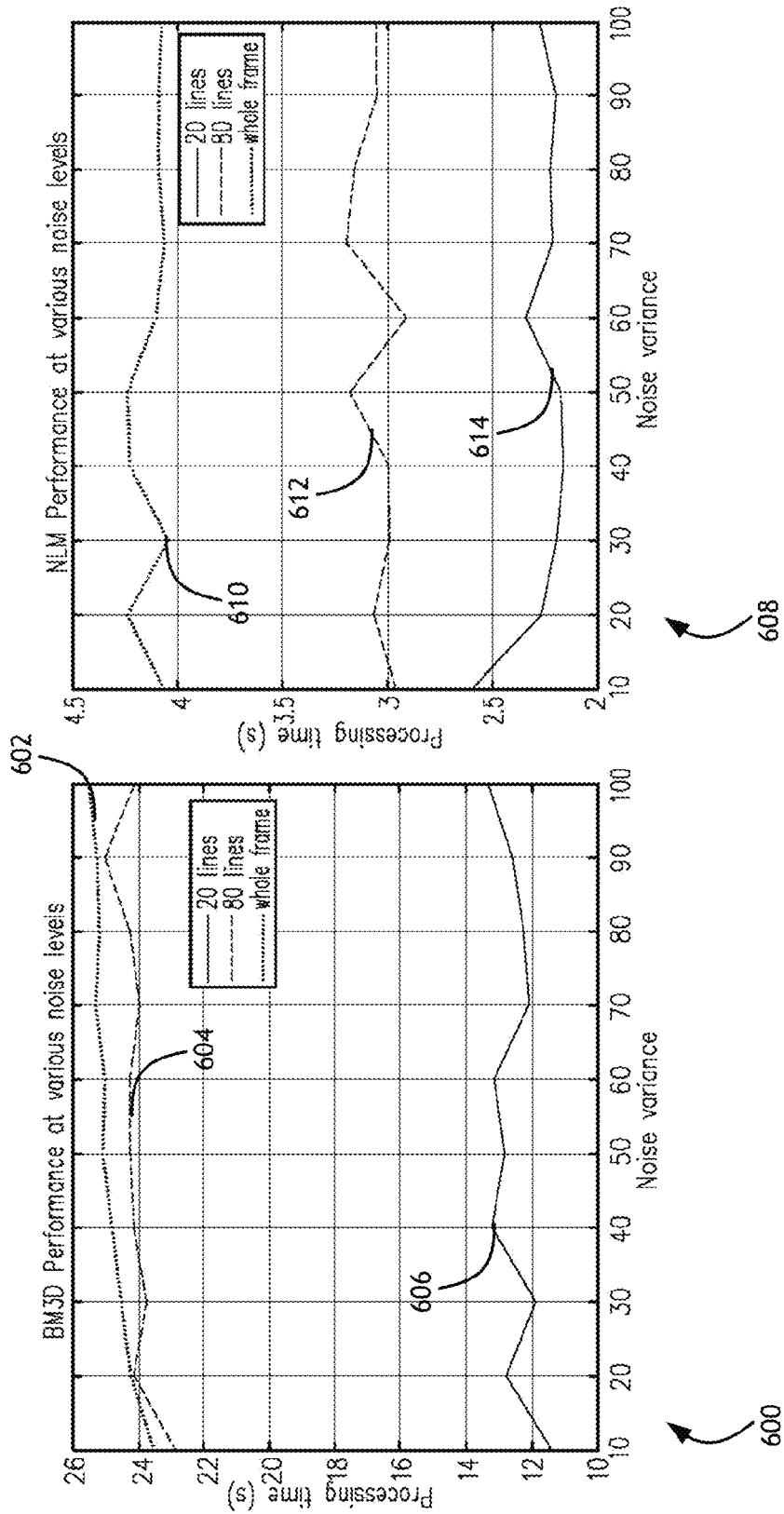
FIG. 6 shows graphs of the speed of denoising processes operating on portions of an image in an image stream according to exemplary embodiments as compared the entire image.

Referring to FIG. 6, graphs 600, 608 of the speed of denoising processes operating on portions of an image in an image stream according to exemplary embodiments as compared the entire image are shown. Referring to a graph 600 of a BM3D denoising process, the graph 600 shows the relation of noise variance to processing time when denoising various portions of the complete image 602. For a complete image 602 with 1200 lines in a 1200 by 1600 frame, the time to denoise the complete image 602 is approximately 5% greater than the time to denoise an 80 line portion 604 of the image. Furthermore, the time to denoise a 20 line portion 606 of the image is approximately half the time of the complete image 602 or the 80 line portion 604.

Referring to a graph 608 of a NLM denoising process, the graph 608 also shows the relation of noise variance to processing time when denoising various portions of the complete image 610. Processing time is substantially different between denoising the complete image 610, an 80 line portion 612 of the image, and a 20 line portion 614 of the image.

Comparisons similar to those shown in FIGS. 5 and 6 may be used to determine an optimal or otherwise desirable image portion size for a given allotted processing time budget. Moreover, comparing the graph 608 of the NLM denoising process to the graph 600 of the BM3D denoising process, the NLM process is approximately five times faster than the BM3D process while the quality of the denoising process in terms of PSNR, as illustrated in FIG. 5, is substantially similar.

Figure 7:
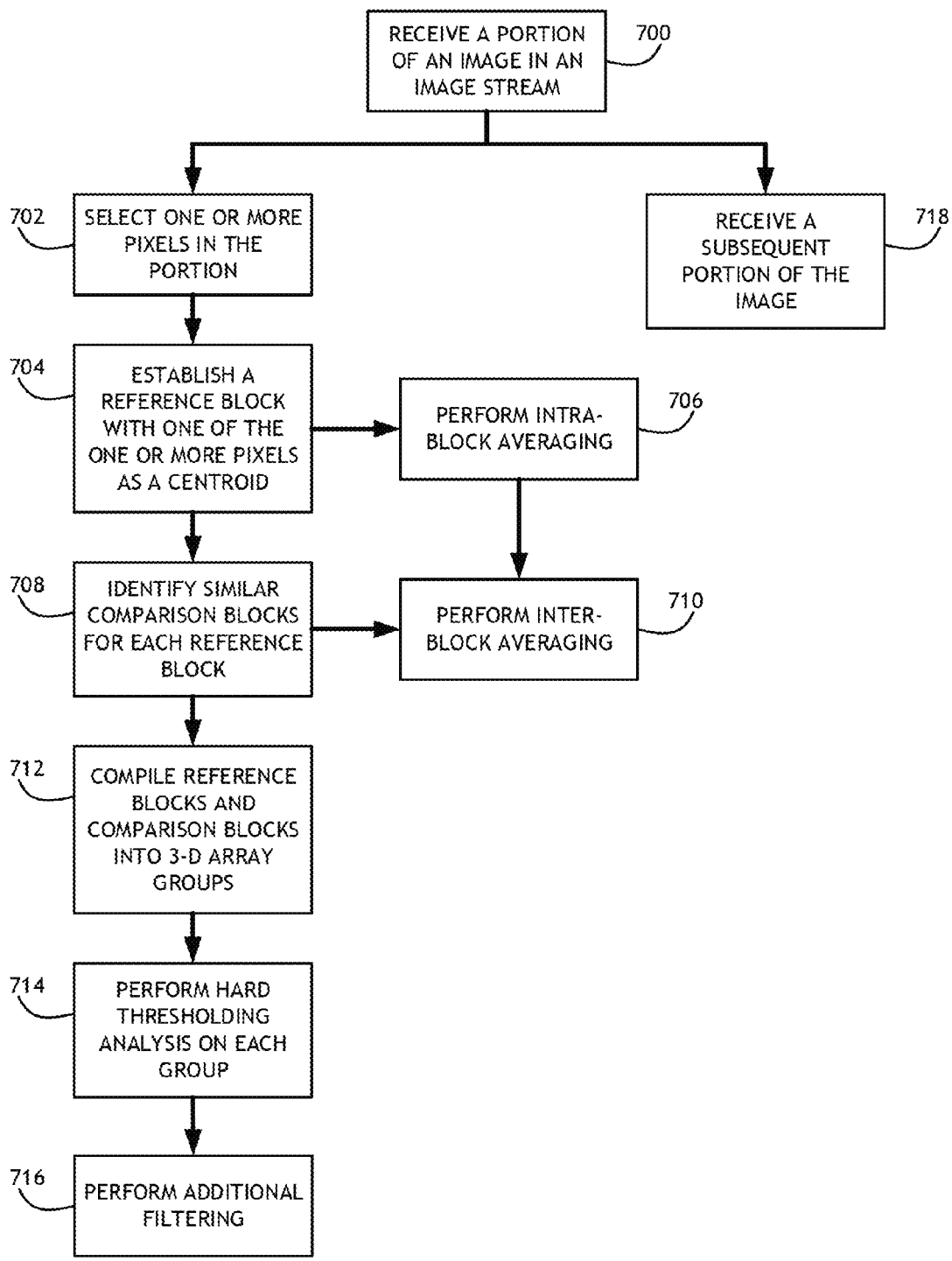
FIG. 7 shows a flowchart of a method for denoising a low-light image in an image stream according to embodiments of the inventive concepts disclosed herein.

Referring to FIG. 7, a flowchart of a method for denoising a low-light image in an image stream according to embodiments of the inventive concepts disclosed herein is shown. A processor receives 700 a portion of an image and selects 702 one or more pixels in that portion. The processor establishes 704 a reference block of a predefined size around each of the one or more pixels.

In some embodiments, the processor performs 706 intra-block averaging on the pixels defined by each reference block based on the assumption that local pixels exhibit high similarity.

The processor then identifies 708 comparison blocks similar to the reference blocks based on a similarity threshold. In some embodiments, each reference block and its corresponding comparison blocks are compiled 712 into 3-D array groups and a hard thresholding analysis is performed 714 on each group. The processor may then perform 716 additional filtering such as with a Weiner filter, or by performing a similar process on the image portion in a different domain (i.e. not the wavelet domain).

In some embodiments, the processor performs 710 inter-block averaging in addition to, or instead of the hard thresholding analysis.

In some embodiments the processor continues to receive 718 a subsequent portion of the image while processing and displaying the already received portion.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A computer apparatus comprising:
    a display;
    a processor;
    a memory coupled to the processor for embodying processor executable code,
    wherein the processor executable code configures the processor to:
        iteratively receive sets of streaming scan lines a low-light image from a low-light image sensor, each set of streaming scan lines comprising no more than $1/15^{th}$ of a full image frame, and each set of streaming scan lines comprising consecutive scan lines;
        apply a denoising process to a first set of streaming scan lines as it is are received, and prior to receiving a subsequent set of streaming scan lines;
        present the denoised set of streaming scan lines on the display; and
        receive a subsequent set of streaming scan lines of the low-light image.

2. The computer apparatus of claim 1, wherein the denoising process comprises:
    selecting one or more pixels in the first set of scan lines;
    defining a reference block surrounding each of the one or more pixels;
    analyzing the first set of scan lines to identify similar comparison blocks within a threshold of similarity; and
    applying a block matching process to enhance the one or more pixels to produce a denoised set of streaming scan lines.

3. The computer apparatus of claim 2, wherein the denoising process further comprises applying a Weiner filter to the set of streaming scan lines of the low-light image.

4. The computer apparatus of claim 2, wherein the processor comprises a multi-core processor, including a first core configured to apply the denoising process to the first set of streaming scan lines of the low-light image and a second core configured to apply the denoising process to the subsequent set of streaming scan lines of the low-light image in parallel.

5. The computer apparatus of claim 2, wherein the block matching process comprises Block Matching and sparse wavelet collaborative filtering (BM3D).

6. The computer apparatus of claim 5, wherein denoising the new set of scan lines comprises variably weighting pixel values based on previous denoising steps.

7. The computer apparatus of claim 2, wherein the block matching process comprises non-local means filtering (NLM).

8. The computer apparatus of claim 1, wherein the processor executable code further configures the processor to:
    remove a plurality of scan lines from the first set of streaming scan lines of the low-light image;
    add a plurality of scan lines to the first set of streaming scan lines of the low-light image, taken from the subsequent set of streaming scan lines to produce a new set of scan lines; and
    denoise the new set of scan lines.

9. A mobile platform including a computer apparatus comprising:
    a display;
    a processor;
    a memory coupled to the processor for embodying processor executable code,
    wherein the processor executable code configures the processor to:
        iteratively receive sets of streaming scan lines low-light image from a low-light image sensor, each set of streaming scan lines comprising no more than $1/15^{th}$ of a full image frame, and each set of streaming scan lines comprising consecutive scan lines;
        select one or more pixels in a first set of streaming scan lines;
        define a reference block surrounding each of the one or more pixels;
        analyze the first set of streaming scan lines to identify similar comparison blocks within a threshold of similarity;
        apply a block matching process to enhance the one or more pixels to produce a denoised set of streaming scan lines as a subsequent set of streaming scan lines is received;
        present the denoised set of streaming scan lines on the display; and
        receive the subsequent set of streaming scan lines of the low-light image.

10. The mobile platform of claim 9, wherein the processor executable code further configures the processor to apply a Weiner filter to the first set of scan lines of the low-light image.

11. The mobile platform of claim 9, wherein the processor executable code further configures the processor to average pixel values within each reference block.

12. The mobile platform of claim 9, wherein the processor executable code further configures the processor to:
    remove a plurality of scan lines from the first set of streaming scan lines of the low-light image;
    add a plurality of scan lines to the first set of streaming scan lines of the low-light image, taken from the subsequent set of streaming scan lines to produce a new set of scan lines; and
    denoise the new set of scan lines.

13. The mobile platform of claim 9, wherein the block matching process comprises Block Matching and sparse wavelet collaborative filtering (BM3D).

14. The mobile platform of claim 9, wherein the block matching process comprises non-local means filtering (NLM).

15. A method for processing a low light image stream comprising:
    iteratively receiving, with a processor, sets of streaming scan lines of a low light image from a camera, each set of streaming scan lines comprising no more than $1/15^{th}$ of a full image frame, and each set of streaming scan lines comprising consecutive scan lines;
    performing, with a processor, at least one image processing step on a first set of streaming scan lines of the low-light image;
    displaying, with a display, the first set of streaming scan lines of the low-light image;

receiving, with the processor, a subsequent set of streaming scan lines of the low-light image; and performing, with the processor, the at least one image processing step on the subsequent set of streaming scan lines of the low-light image, wherein the at least one image processing step comprises a denoising process, a pattern matching process, an image compression process, an image restoration process, and an image enhancement process.

16. The method of claim 15, further comprising:

selecting, with the processor, one or more pixels in the first set of streaming scan lines;

defining, with the processor, a reference block surrounding each of the one or more pixels;

analyzing, with the processor, the first set of streaming scan lines to identify similar comparison blocks within a threshold of similarity; and applying, with the processor, a block matching process to enhance the one or more pixels to produce a denoised set of streaming scan lines.

17. The method of claim 15, further comprising averaging, with the processor, pixel values within each reference block.

18. The method of claim 15, further comprising:

removing, with the processor, a plurality of scan lines from the first set of streaming scan lines of the low-light image;

adding, with the processor, a plurality of scan lines to the first set of streaming scan lines of the low-light image, taken from the subsequent set of streaming scan lines to produce a new set of scan lines; and denoising the new set of scan lines with the processor.

19. The method of claim 15, wherein the block matching process comprises Block Matching and sparse wavelet collaborative filtering (BM3D).

20. The method of claim 15, wherein the block matching process comprises non-local means filtering (NLM).

* * * * *